US008701995B2

(12) United States Patent
Nakajima et al.

(10) Patent No.: US 8,701,995 B2
(45) Date of Patent: Apr. 22, 2014

(54) METHOD AND DEVICE FOR MAGNETIC DATA DEMODULATION

(75) Inventors: Shigeo Nakajima, Nagano (JP); Yoichi Isono, Nagano (JP); Katsuhisa Higashi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 132 days.

(21) Appl. No.: 13/556,330

(22) Filed: Jul. 24, 2012

(65) Prior Publication Data

US 2013/0026234 A1 Jan. 31, 2013

(30) Foreign Application Priority Data

Jul. 25, 2011 (JP) .................................. 2011-162007

(51) Int. Cl.
*G06K 7/08* (2006.01)
(52) U.S. Cl.
USPC ......................................... 235/449; 235/486
(58) Field of Classification Search
USPC ................................ 235/449, 486, 380; 360/2
See application file for complete search history.

(56) References Cited

U.S. PATENT DOCUMENTS

| 5,285,328 | A | * | 2/1994 | Behr et al. ..................... 360/53 |
| 5,452,143 | A | * | 9/1995 | Kamagami ..................... 360/2 |
| 8,109,445 | B2 | * | 2/2012 | Sawada et al. ................. 235/492 |
| 8,538,332 | B2 | * | 9/2013 | Huomo et al. ................ 455/41.2 |

FOREIGN PATENT DOCUMENTS

JP 58-050611 3/1983

* cited by examiner

*Primary Examiner* — Ahshik Kim
(74) *Attorney, Agent, or Firm* — Frommer Lawrence & Haug LLP (57) ABSTRACT

A method for demodulation where a plurality of preliminary data rows for creating the demodulated data are created according to intervals, each of which is a interval between peaks in a read signal coming from a magnetic head. Each preliminary data row includes first individual data identified according to the intervals, wherein a plurality of bits constitute the first individual data. At the time of creating the preliminary data row, standard intervals are identified for judging a first individual datum to be either "0" or "1", and the standard intervals are assigned in a template saved beforehand. Then, intervals for judgment are compared with the standard intervals assigned in the template, with respect to each bit of each bit patterns. A bit pattern in relation to the preliminary data row is identified according to the comparison result, in order to set the preliminary data row with the identified bit pattern.

6 Claims, 8 Drawing Sheets

| | | | | | |
|---|---|---|---|---|---|
| PRELIMINARY DATA ROW 1 | 0 | 0 | 0 | 0 | 0 |
| PRELIMINARY DATA ROW 2 | 0 | 0 | 0 | 0 | 1 |
| PRELIMINARY DATA ROW 3 | 0 | 0 | 0 | 1 | 1 |
| PRELIMINARY DATA ROW 4 | 0 | 0 | 1 | 1 | 0 |
| PRELIMINARY DATA ROW 5 | 0 | 1 | 1 | 0 | 0 |
| PRELIMINARY DATA ROW 6 | 1 | 1 | 0 | 0 | 0 |
| PRELIMINARY DATA ROW 7 | 1 | 0 | 0 | 0 | 1 |
| PRELIMINARY DATA ROW 8 | 0 | 0 | 0 | 1 | 1 |
| PRELIMINARY DATA ROW 9 | 0 | 0 | 1 | 1 | 1 |
| PRELIMINARY DATA ROW 10 | 0 | 1 | 1 | 1 | 1 |
| PRELIMINARY DATA ROW 11 | 1 | 1 | 1 | 1 | 0 |
| PRELIMINARY DATA ROW 12 | 1 | 1 | 1 | 0 | 0 |
| PRELIMINARY DATA ROW 13 | 1 | 1 | 0 | 0 | 0 |
| PRELIMINARY DATA ROW 14 | 1 | 0 | 0 | 0 | 0 |
| PRELIMINARY DATA ROW 15 | 0 | 0 | 0 | 0 | 0 |

FIG. 4

| | INTERVALS FOR JUDGMENT | | | | | SUM OF THE ABSOLUTE VALUES OF DIFFERENCES |
|---|---|---|---|---|---|---|
| | 1 | 2 | 3 | 4 | 5 | |
| | 441 | 278 | 338 | 631 | 637 | |
| BIT PATTERN 1 | "0" | "0" | "0" | "0" | "0" | |
| STANDARD INTERVALS | 681 | 681 | 681 | 681 | 681 | |
| ABSOLUTE VALUES OF DIFFERENCES BETWEEN STANDARD INTERVALS AND INTERVALS FOR JUDGMENT | 240 | 403 | 343 | 50 | 44 | 1080 |
| BIT PATTERN 2 | "1" | "1" | "0" | "0" | "0" | |
| STANDARD INTERVALS | 340.5 | 340.5 | 681 | 681 | 681 | |
| ABSOLUTE VALUES OF DIFFERENCES BETWEEN STANDARD INTERVALS AND INTERVALS FOR JUDGMENT | 100.5 | 62.5 | 343 | 50 | 44 | 600 |
| BIT PATTERN 3 | "0" | "1" | "1" | "0" | "0" | |
| STANDARD INTERVALS | 681 | 340.5 | 340.5 | 681 | 681 | |
| ABSOLUTE VALUES OF DIFFERENCES BETWEEN STANDARD INTERVALS AND INTERVALS FOR JUDGMENT | 240 | 62.5 | 2.5 | 50 | 44 | 399 |
| BIT PATTERN 4 | "0" | "0" | "1" | "1" | "0" | |
| STANDARD INTERVALS | 681 | 681 | 340.5 | 340.5 | 681 | |
| ABSOLUTE VALUES OF DIFFERENCES BETWEEN STANDARD INTERVALS AND INTERVALS FOR JUDGMENT | 240 | 403 | 2.5 | 290.5 | 44 | 980 |
| BIT PATTERN 5 | "1" | "1" | "1" | "1" | "0" | |
| STANDARD INTERVALS | 340.5 | 340.5 | 340.5 | 340.5 | 681 | |
| ABSOLUTE VALUES OF DIFFERENCES BETWEEN STANDARD INTERVALS AND INTERVALS FOR JUDGMENT | 100.5 | 62.5 | 2.5 | 290.5 | 44 | 500 |
| BIT PATTERN 6 | "0" | "0" | "0" | "0" | "1" | |
| STANDARD INTERVALS | 681 | 681 | 681 | 681 | 340.5 | |
| ABSOLUTE VALUES OF DIFFERENCES BETWEEN STANDARD INTERVALS AND INTERVALS FOR JUDGMENT | 240 | 403 | 343 | 50 | 296.5 | 1332.5 |
| BIT PATTERN 7 | "1" | "1" | "0" | "0" | "1" | |
| STANDARD INTERVALS | 340.5 | 340.5 | 681 | 681 | 340.5 | |
| ABSOLUTE VALUES OF DIFFERENCES BETWEEN STANDARD INTERVALS AND INTERVALS FOR JUDGMENT | 100.5 | 62.5 | 343 | 50 | 296.5 | 852.5 |
| BIT PATTERN 8 | "0" | "1" | "1" | "0" | "1" | |
| STANDARD INTERVALS | 681 | 340.5 | 340.5 | 681 | 340.5 | |
| ABSOLUTE VALUES OF DIFFERENCES BETWEEN STANDARD INTERVALS AND INTERVALS FOR JUDGMENT | 240 | 62.5 | 2.5 | 50 | 296.5 | 651.5 |
| BIT PATTERN 9 | "0" | "0" | "0" | "1" | "1" | |
| STANDARD INTERVALS | 681 | 681 | 681 | 340.5 | 340.5 | |
| ABSOLUTE VALUES OF DIFFERENCES BETWEEN STANDARD INTERVALS AND INTERVALS FOR JUDGMENT | 240 | 403 | 343 | 290.5 | 296.5 | 1573 |
| BIT PATTERN 10 | "1" | "1" | "0" | "1" | "1" | |
| STANDARD INTERVALS | 340.5 | 340.5 | 681 | 340.5 | 340.5 | |
| ABSOLUTE VALUES OF DIFFERENCES BETWEEN STANDARD INTERVALS AND INTERVALS FOR JUDGMENT | 100.5 | 62.5 | 343 | 290.5 | 296.5 | 1093 |
| BIT PATTERN 11 | "0" | "0" | "1" | "1" | "1" | |
| STANDARD INTERVALS | 681 | 681 | 340.5 | 340.5 | 340.5 | |
| ABSOLUTE VALUES OF DIFFERENCES BETWEEN STANDARD INTERVALS AND INTERVALS FOR JUDGMENT | 240 | 403 | 2.5 | 290.5 | 296.5 | 1232.5 |
| BIT PATTERN 12 | "0" | "1" | "1" | "1" | "1" | |
| STANDARD INTERVALS | 681 | 340.5 | 340.5 | 340.5 | 340.5 | |
| ABSOLUTE VALUES OF DIFFERENCES BETWEEN STANDARD INTERVALS AND INTERVALS FOR JUDGMENT | 240 | 62.5 | 2.5 | 290.5 | 296.5 | 892 |
| BIT PATTERN 13 | "1" | "1" | "1" | "1" | "1" | |
| STANDARD INTERVALS | 340.5 | 340.5 | 340.5 | 340.5 | 340.5 | |
| ABSOLUTE VALUES OF DIFFERENCES BETWEEN STANDARD INTERVALS AND INTERVALS FOR JUDGMENT | 100.5 | 62.5 | 2.5 | 290.5 | 296.5 | 752.5 |

FIG. 5

| | | | | | | | | | | |
|---|---|---|---|---|---|---|---|---|---|---|
| DATA STORAGE UNIT (9) | INTERVALS FOR JUDGMENT 5 | t9 | t10 | t11 | t12 | t13 | t14 | t15 | t16 | t17 | t18 | t19 |
| DATA STORAGE UNIT (8) | INTERVALS FOR JUDGMENT 4 | t8 | t9 | t10 | t11 | t12 | t13 | t14 | t15 | t16 | t17 | t18 |
| DATA STORAGE UNIT (7) | INTERVALS FOR JUDGMENT 3 | t7 | t8 | t9 | t10 | t11 | t12 | t13 | t14 | t15 | t16 | t17 |
| DATA STORAGE UNIT (6) | INTERVALS FOR JUDGMENT 2 | t6 | t7 | t8 | t9 | t10 | t11 | t12 | t13 | t14 | t15 | t16 |
| DATA STORAGE UNIT (5) | INTERVALS FOR JUDGMENT 1 | t5 | t6 | t7 | t8 | t9 | t10 | t11 | t12 | t13 | t14 | t15 |
| DATA STORAGE UNIT (4) | INTERVALS FOR CALCULATION 4 | t4 | t5 | t6 | t7 | t8 | t9 | t10 | t11 | t12 | t13 | t14 |
| DATA STORAGE UNIT (3) | INTERVALS FOR CALCULATION 3 | t3 | t4 | t5 | t6 | t7 | t8 | t9 | t10 | t11 | t12 | t13 |
| DATA STORAGE UNIT (2) | INTERVALS FOR CALCULATION 2 | t2 | t3 | t4 | t5 | t6 | t7 | t8 | t9 | t10 | t11 | t12 |
| DATA STORAGE UNIT (1) | INTERVALS FOR CALCULATION 1 | t1 | t2 | t3 | t4 | t5 | t6 | t7 | t8 | t9 | t10 | t11 |
| DATA STORAGE UNIT (0) | | — | t1 | t2 | t3 | t4 | t5 | t6 | t7 | t8 | t9 | t10 |

| | PATTERN 'A' | PATTERN 'B' | PATTERN 'C' | PATTERN 'D' | PATTERN 'E' | PATTERN 'F' | PATTERN 'G' |
|---|---|---|---|---|---|---|---|
| FIRST INDIVIDUAL DATA IN RELATION TO INTERVALS FOR CALCULATION 4 | 0 | 0 | 1 | 1 | 1 | 1 | 1 |
| FIRST INDIVIDUAL DATA IN RELATION TO INTERVALS FOR CALCULATION 3 | 0 | 1 | 0 | 0 | 1 | 1 | 1 |
| FIRST INDIVIDUAL DATA IN RELATION TO INTERVALS FOR CALCULATION 2 | x | x | 0 | 1 | 1 | 1 | 0 |
| FIRST INDIVIDUAL DATA IN RELATION TO INTERVALS FOR CALCULATION 1 | x | x | x | x | 0 | 1 | x |

FIG. 8

METHOD AND DEVICE FOR MAGNETIC DATA DEMODULATION

The present application claims priority from Japanese Patent Application No. JP 2011-162007 filed on Jul. 25, 2011, the disclosure of which is incorporated herein by reference in its entirety.

FIELD OF THE INVENTION

The present invention relates to a method and a device for magnetic data demodulation, by which magnetic data recorded in a magnetic information recording medium is read out for creating demodulated data.

DESCRIPTION OF RELATED ART

It is noted that citation or identification of any document in this application is not an admission that such document is available as prior art to the present invention.

Conventionally, known is a method for magnetic data demodulation, by which magnetic data recorded in a magnetic information recording medium is read out for creating demodulated data (For example, refer to Japanese Unexamined Patent Application Publication No. 58-50611*("JP 58-50611*"). According to a method for demodulation described in JP 58-50611*, a time period (a standard interval) as a result of multiplying an interval of an adjacent bit positioned one bit before a bit to be judged by a certain rate, and an interval of the bit to be judged are compared each other in order to judge whether a datum of the bit to be judged is "0" or "1."

In the method for demodulation described in JP 58-50611*, one standard interval and an interval of a bit to be judged are compared each other in order to make a judgment on a datum of the bit. Therefore, in the case where a transfer speed of a magnetic information recording medium fluctuates on a grand scale, or a recording accuracy of magnetic data recorded in a magnetic information recording medium is low, unfortunately the magnetic data cannot be demodulated appropriately so that an error happens with a high possibility.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Then, it is a subject of the present invention to provide a method for magnetic data demodulation, by which the magnetic data can be demodulated appropriately even though a transfer speed of a magnetic information recording medium fluctuates on a grand scale, or a recording accuracy of the magnetic data recorded in a magnetic information recording medium is low. Furthermore, it is another subject of the present invention to provide a device for magnetic data demodulation, by which the magnetic data can be demodulated appropriately even though a transfer speed of a magnetic information recording medium fluctuates on a grand scale, or a recording accuracy of the magnetic data recorded in a magnetic information recording medium is low.

To bring a solution for the subject described above, with regard to a method for magnetic data demodulation according to the present invention; a method for magnetic data demodulation, by which magnetic data recorded in a magnetic information recording medium is read out for creating demodulated data, includes: a preliminary data creating step in order to create a plurality of preliminary data rows for creating the demodulated data according to intervals, each of which is a time interval between peaks in a read signal of the magnetic data in an analog state, or a reversing time interval in a digital signal created from the read signal; wherein each of the preliminary data rows includes first individual data identified according to the intervals, the first individual data being a plurality of bits; and the preliminary data creating step includes: a standard interval identifying step for identifying a first standard interval being the interval as a criterion for judging a first individual datum of the preliminary data row to be "0", and a second standard interval being the interval as a criterion for judging a first individual datum to be "1"; a standard interval assigning step for making assignments for each of second individual data in a template, in which listed are at least part of a plurality of bit patterns including the second individual data that have the same number of plural bits as the first individual data constituting the preliminary data row have, namely the standard interval assigning step assigning the first standard interval to a second individual datum being "0", and the second standard interval to a second individual datum being "1"; a comparison step for comparing a plurality of intervals for judgment as the intervals for identifying the first individual data with either of the first standard interval or the second standard interval, which is assigned in the template, with respect to each bit of each of the bit patterns; and a preliminary data identifying step for identifying the bit pattern in relation to the preliminary data row according to a comparison result at the comparison step, and setting the preliminary data row with the identified bit pattern.

In the method for magnetic data demodulation according to the present invention; at the comparison step, a plurality of intervals for judgment as the intervals for identifying the first individual data constituting the preliminary data row are compared with either of the first standard interval or the second standard interval, which is assigned in the template, with respect to each bit of each of the bit patterns. At the preliminary data identifying step, identified is the bit pattern in relation to the preliminary data row according to a comparison result at the comparison step, and the identified bit pattern is set as the preliminary data row. In other words; according to the present invention, the preliminary data row is identified by using the plurality of intervals for judgment. Therefore, even in the case where a transfer speed of the magnetic information recording medium fluctuates on a grand scale, or a recording accuracy of magnetic data recorded in the magnetic information recording medium is low it becomes possible to appropriately identify the preliminary data row so that it becomes possible to create appropriate demodulated data out of the plurality of preliminary data rows. Namely, according to the present invention, it becomes possible to appropriately demodulate the magnetic data even though a transfer speed of the magnetic information recording medium fluctuates on a grand scale, or a recording accuracy of the magnetic data recorded in the magnetic information recording medium is low.

In the present invention; it is preferable that, calculated at the comparison step are the absolute values of differences between the intervals for judgment and either of the first standard interval or the second standard interval, which is assigned in the template, with respect to each bit of each of the bit patterns; and calculated at the preliminary data identifying step is the total value that is a sum of absolute values for each bit pattern, each of the absolute values being calculated for each bit at the comparison step; and then preferably the bit pattern having the calculated total value being minimum becomes the preliminary data row. According to this process configuration, it becomes possible to appropriately identify the preliminary data row by means of relatively easy processing.

In the present invention; calculated at the comparison step may be squared values, each of which is obtained by squaring each of differences between the intervals for judgment and either of the first standard interval or the second standard interval, which is assigned in the template, with respect to each bit of each of the bit patterns; and calculated at the preliminary data identifying step may be the total value that is a sum of squared values for each bit pattern, each of the squared values being calculated for each bit at the comparison step; and then the bit pattern having the calculated total value being minimum may become the preliminary data row. In this case, it still becomes possible to appropriately identify the preliminary data row, even without comparing in size the intervals for judgment and either of the first standard interval or the second standard interval, assigned in the template.

In the present invention; it is preferable that, at the standard interval identifying step, the first standard interval and the second standard interval are calculated and then identified, according to one set or at least two sets of the intervals immediately before the plurality of intervals for judgment. According to this process configuration, it becomes possible to identify the first standard interval and the second standard interval further appropriately, even though a transfer speed of the magnetic information recording medium fluctuates on a grand scale. Accordingly, it becomes possible to demodulate the magnetic data further appropriately, even though a transfer speed of the magnetic information recording medium fluctuates on a grand scale.

In the present invention; preferably the preliminary data row includes the first individual data with the number of bits in a range of 3-bit to 8-bit. In the case where a preliminary data row includes first individual data of 3-bit or a greater number of bits, it becomes possible to identify the preliminary data row more appropriately, even though a transfer speed of the magnetic information recording medium fluctuates on a grand scale, or a recording accuracy of magnetic data recorded in the magnetic information recording medium is low. Meanwhile, in the case where a preliminary data row includes first individual data of 8-bit or a less number of bits, it becomes possible to prevent the process time for creating the preliminary data row from unnecessarily becoming long.

To bring a solution for the subject described above, a device for magnetic data demodulation according to the present invention includes: a magnetic head for reading out magnetic data recorded in a magnetic information recording medium; and a data demodulation section for creating demodulated data by means of demodulating the magnetic data read out by the magnetic head; wherein the data demodulation section includes: a preliminary data creating section that creates a plurality of preliminary data rows for creating the demodulated data according to intervals, each of which is a time interval between peaks in a read signal of the magnetic data in an analog state output from the magnetic head, or a reversing time interval in a digital signal created from the read signal; and a demodulated data creating section that creates the demodulated data according to the plurality of preliminary data rows created by the preliminary data creating section; and each of the preliminary data rows includes first individual data identified according to the intervals, the first individual data being a plurality of bits; the preliminary data creating section saves a template, in which listed are at least part of a plurality of bit patterns including the second individual data that have the same number of plural bits as the first individual data constituting the preliminary data row have; the preliminary data creating section identifies a first standard interval being the interval as a criterion for judging a first individual datum of the preliminary data row to be "0", and a second standard interval being the interval as a criterion for judging a first individual datum to be "1"; the preliminary data creating section makes assignments for each of second individual data in the template, in such a way as to assign the first standard interval to a second individual datum being "0", and the second standard interval to a second individual datum being "1"; the preliminary data creating section compares a plurality of intervals for judgment as the intervals for identifying the first individual data with either of the first standard interval or the second standard interval, which is assigned in the template, with respect to each bit of each of the bit patterns; and the preliminary data creating section identifies the bit pattern in relation to the preliminary data row according to the comparison result, and sets the preliminary data row with the identified bit pattern.

In the device for magnetic data demodulation according to the present invention; the preliminary data creating section compares a plurality of intervals for judgment as the intervals for identifying the first individual data constituting the preliminary data row with either of the first standard interval or the second standard interval, which is assigned in the template, with respect to each bit of each of the bit patterns. Then, identified is the bit pattern in relation to the preliminary data row according to the comparison result, and the identified bit pattern is set as the preliminary data row. In other words; according to the present invention, the preliminary data row is identified by using the plurality of intervals for judgment. Therefore, according to the present invention, even in the case where a transfer speed of the magnetic information recording medium fluctuates on a grand scale, or a recording accuracy of magnetic data recorded in the magnetic information recording medium is low, it becomes possible to appropriately identify the preliminary data row so that it becomes possible to appropriately demodulate the magnetic data according to the plurality of preliminary data rows identified appropriately.

As described above, by means of a method and a device according to the present invention for magnetic data demodulation, it becomes possible to appropriately demodulate the magnetic data even though a transfer speed of a magnetic information recording medium fluctuates on a grand scale, or a recording accuracy of magnetic data recorded in a magnetic information recording medium is low.

BRIEF DESCRIPTION OF THE DRAWINGS

FIG. 4 is a table for explaining a template saved in the preliminary data creating section shown in FIG. 1.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An embodiment of the present invention is described below with reference to the accompanying drawings.

Figure 1:
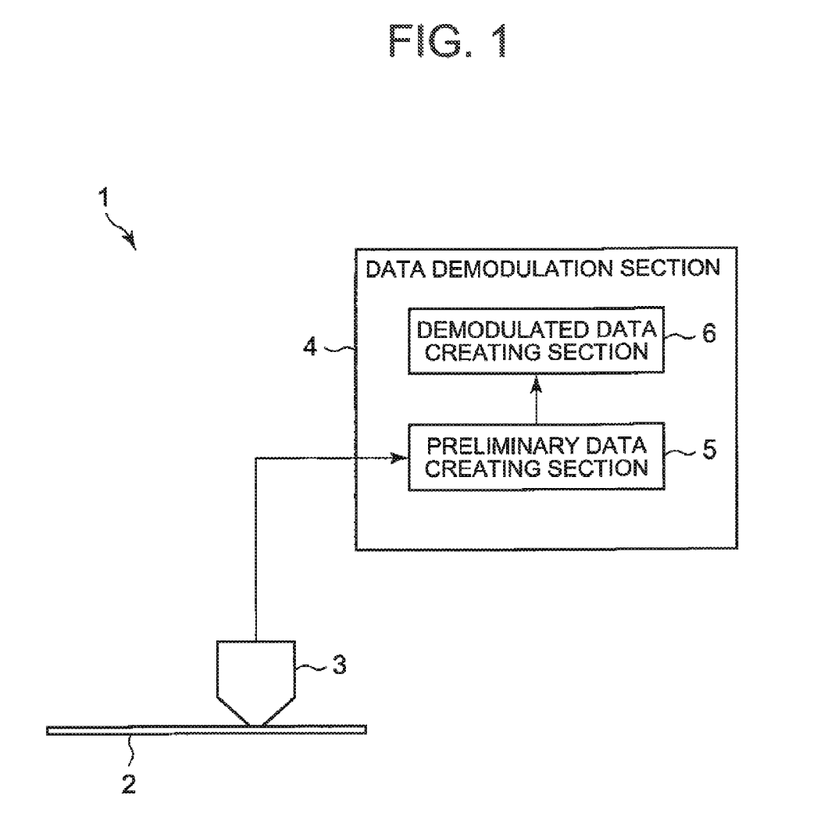
FIG. 1 is a block diagram showing a schematic configuration of a device for magnetic data demodulation according to an embodiment of the present invention.
Figure 2:
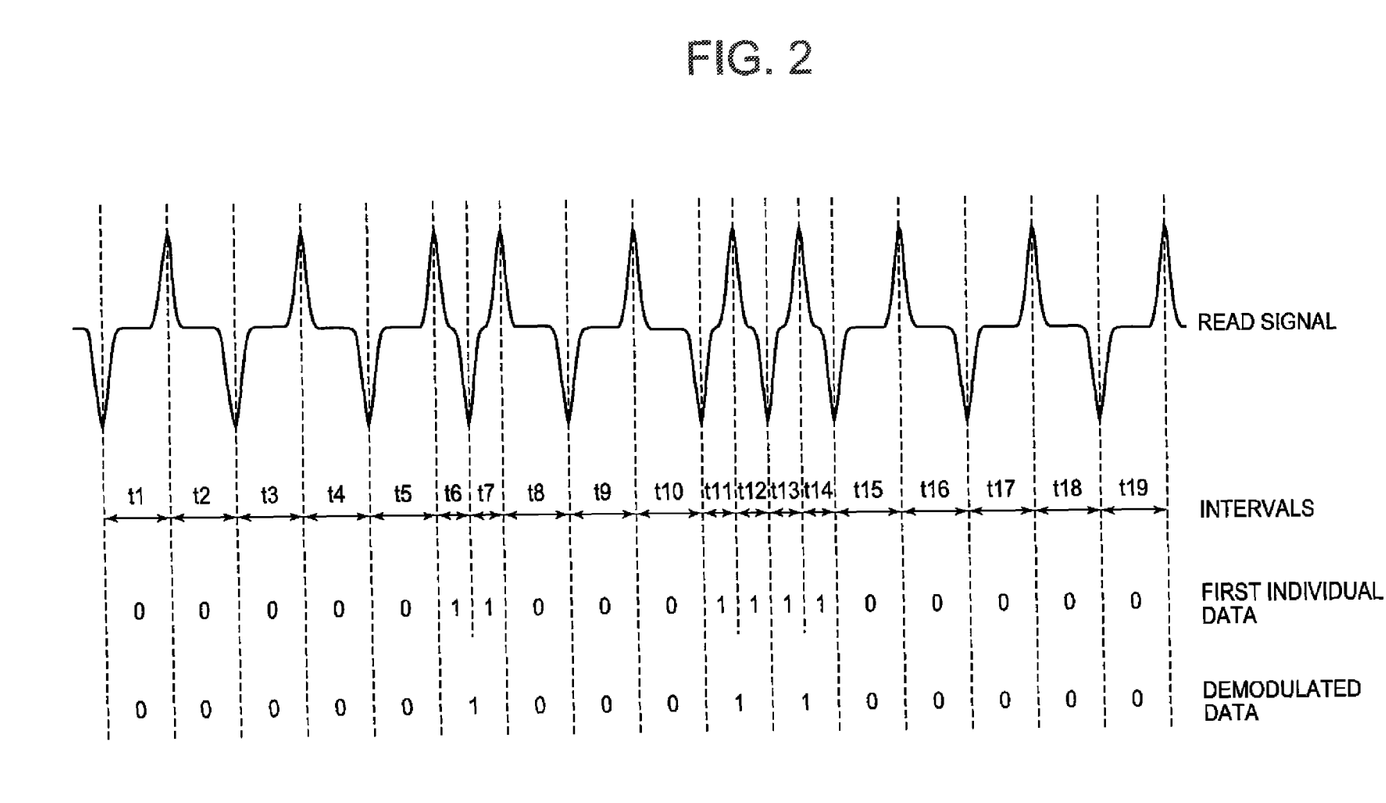
FIG. 2 is a drawing for explaining an outline of demodulated data creating procedures in a data demodulation section shown in FIG. 1.
Figure 3:
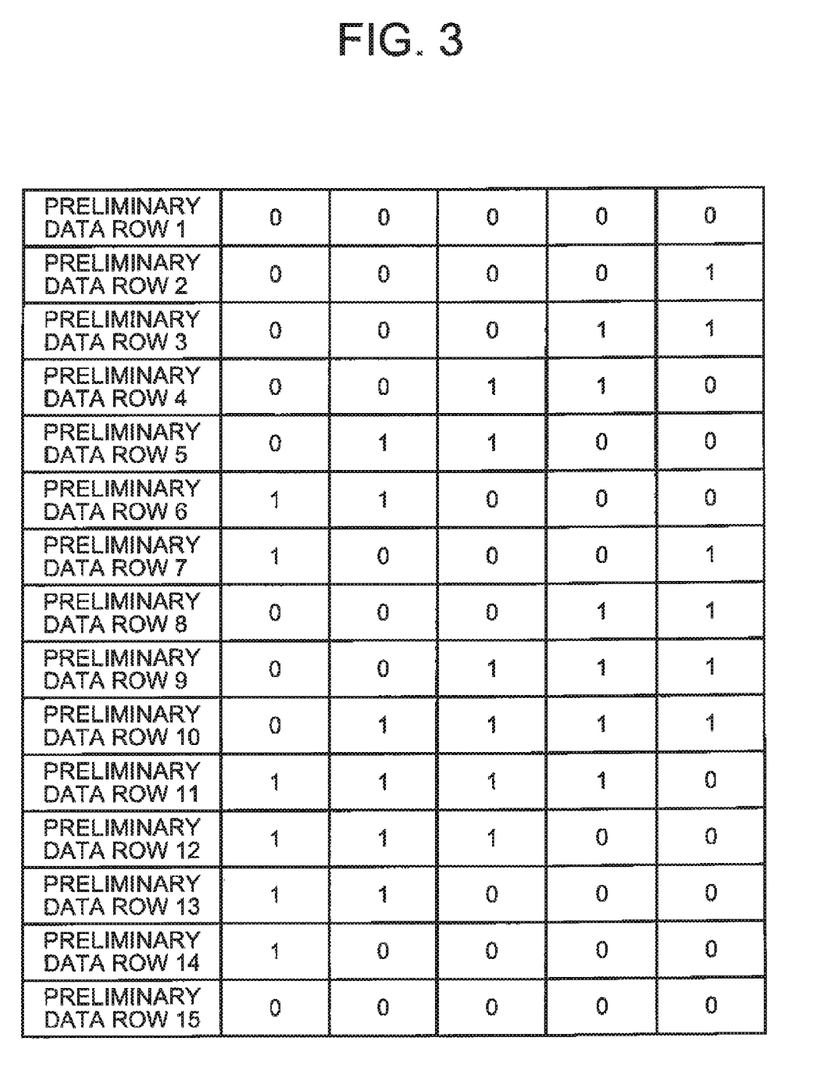
FIG. 3 is a table for explaining a plurality of preliminary data rows created in a preliminary data creating section shown in FIG. 1.
Figure 5:
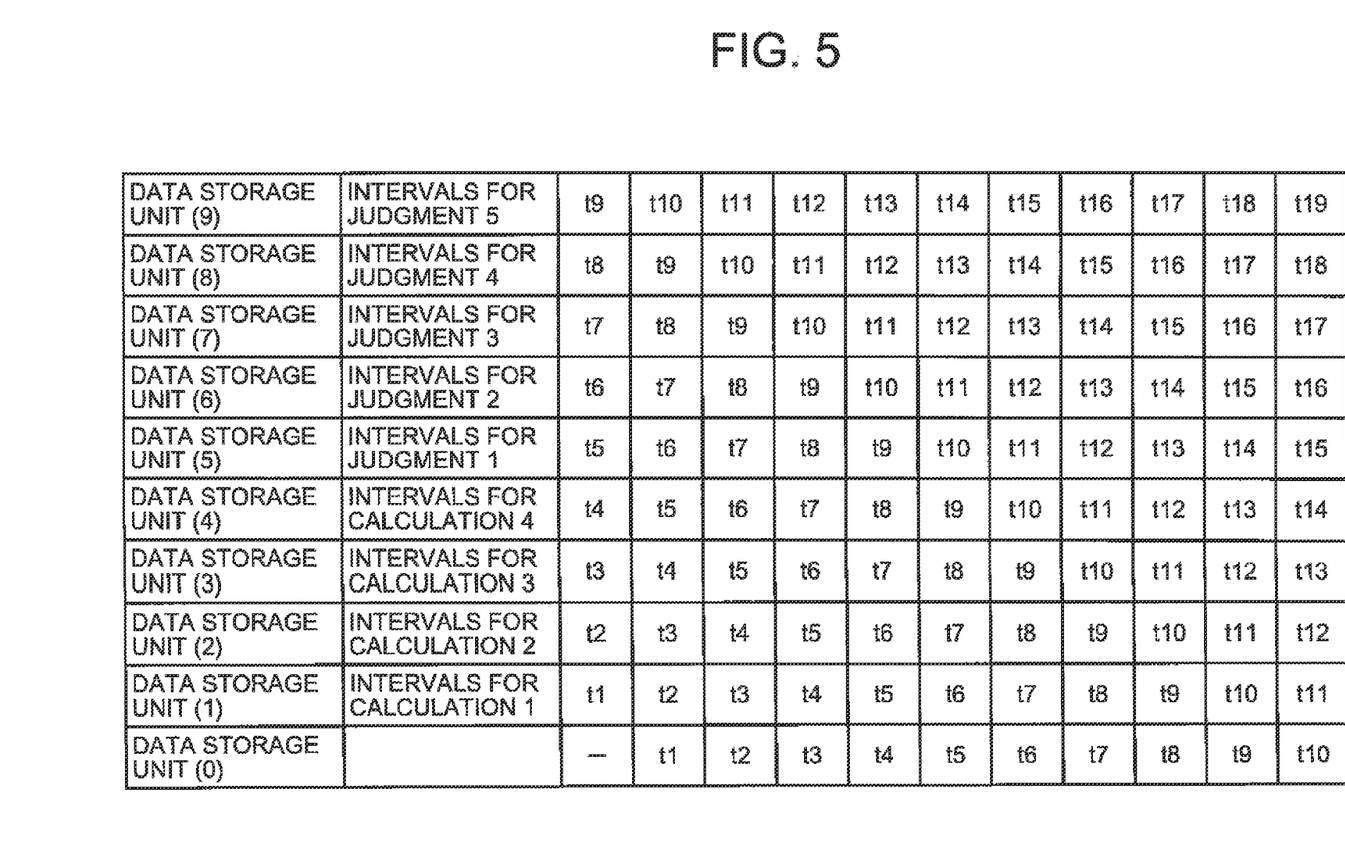
FIG. 5 is a table for explaining intervals stored in the preliminary data creating section shown in FIG. 1.

Schematic Configuration of a Device for Magnetic Data Demodulation:

FIG. 1 is a block diagram showing a schematic configuration of a device for magnetic data demodulation 1 according to an embodiment of the present invention. FIG. 2 is a drawing for explaining an outline of demodulated data creating procedures in a data demodulation section 4 shown in FIG. 1. FIG. 3 is a table for explaining a plurality of preliminary data tows created in a preliminary data creating section 5 shown in FIG. 1. FIG. 4 is a table for explaining a template saved in the preliminary data creating section 5 shown in FIG. 1. FIG. 5 is a table for explaining intervals stored in the preliminary data creating section 5 shown in FIG. 1.

The device for magnetic data demodulation 1 according to the present embodiment is a device for reading out magnetic data recorded in a card 2 as a magnetic information recording medium and creating demodulated data. For example, the device for magnetic data demodulation 1 is a card reader of a manual operation type for reading the magnetic data of the card 2 while the card 2 being transferred manually. The device for magnetic data demodulation 1 includes a magnetic head 3 for reading out the magnetic data recorded in the card 2, and the data demodulation section 4 for creating demodulated data by way of demodulating the magnetic data read out by the magnetic head 3. In the present embodiment, the magnetic data is recorded in the card 2 through an F2F frequency modulation method.

For example, the card 2 is a rectangular-shaped PVC card having a thickness of around 0.7 to 0.8 mm. Formed in the card is a magnetic stripe in which magnetic data is recorded. Incidentally, in the card, an IC chip may be fixed and/or an antenna for data communication may be embedded. Moreover, the card 2 may be a PET (polyethylene terephthalate) card having a thickness of around 0.18 to 0.36 mm, or it may be a paper card and the like having a predetermined thickness.

The data demodulation section 4 includes: a storage means such as a ROM, a RAM, and so on; a calculation means such as a CPU and son; and the like. The data demodulation section 4 is provided with a preliminary data creating section 5 that creates a plurality of preliminary data rows for creating demodulated data, and a demodulated data creating section 6 that creates the demodulated data according to the plurality of preliminary data rows created in the preliminary data creating section 5.

The preliminary data creating section 5 creates the plurality of preliminary data rows for creating the demodulated data, according to intervals t1 to t19, each of which is a time interval between peaks in a read signal (Refer to FIG. 2) of analog magnetic data output from the magnetic head 3. The preliminary data rows in the present embodiment include first individual data that are "0" & "1" data identified according to the intervals t1 to t19, wherein the first individual data being continuous 5-bit data.

As described later, in the present embodiment, a preliminary data row is created each time when a peak is detected in the read signal output from the magnetic head 3. With respect to a range of the read signal shown in FIG. 2, the preliminary data creating section 5 creates 15 preliminary data rows, i.e., from a preliminary data row 1 to a preliminary data row 15, as shown in FIG. 3. A detailed way of creating preliminary data rows in the preliminary data creating section 5 is described later. Incidentally, for convenience of explanation, FIG. 2 shows an example of a read signal wave in the case where the card 2 is transferred at a constant speed.

The demodulated data creating section 6 creates the demodulated data according to the first individual data constituting the preliminary data rows. As shown in FIG. 2, in the present invention; a "0" datum in the first individual data, as it is, becomes a "0" datum in the demodulated data; and meanwhile two consecutive "1" data in the first individual data become a "1" datum in the demodulated data. Therefore, in the present embodiment, an odd number of "1" data of the first individual data never exist between "0" data of the first individual data.

In the meantime, the preliminary data creating section 5 saves a template in which part of a plurality of bit patterns including 5-bit second individual data are listed. In the template of the present embodiment, listed are 13 bit patterns, i.e., a bit pattern 1 to a bit pattern 13, out of 32 bit patterns supposed as 5-bit bit patterns, as shown in FIG. 4. Since an odd number of "1" data of the first individual data never exist between "0" data of the first individual data, as described above, any bit pattern including an odd number of "1" data between "0" data is not listed in the template saved in the preliminary data creating section 5. Incidentally, as a bit pattern including an odd number of "1" data between "0" data, there are 12 bit patterns.

Each time when a peak is detected in the read signal output from the magnetic head 3, an interval as a time interval between peaks is sequentially measured and stored in a data storage unit of the preliminary data creating section 5. In the present embodiment, the preliminary data creating section 5 includes 10 data storage units, i.e., a data storage unit (0) to a data storage unit (9) (Refer to FIG. 5); and latest intervals are stored in the data storage unit (9). When the latest intervals are stored in the data storage unit (9), intervals having been stored in a data storage unit (N) (wherein, 'N' is an integer in a range from 1 to 9) are now stored in a data storage unit (N−1). In other words, intervals 't1' to 't19' stored in the data storage unit (9) are sequentially shifted in such a way; from the data storage unit (9) to the data storage unit (8), - - -, from the data storage unit (1) to the data storage unit (0), as shown in FIG. 5, each time when a peak is detected in the read signal.

In the present embodiment, intervals stored in the data storage units (9) to (5) are intervals for judgment in order to create a 5-bit preliminary data row by means of identifying first individual data. Namely, the first individual data are identified according to the intervals for judgment stored in the data storage units (9) to (5), so as to create a 5-bit preliminary data row. For example, as shown in FIG. 5, a 5-bit preliminary data row is created according to intervals for judgment 't9' to 't5' stored in the data storage units (9) to (5); or a 5-bit preliminary data row is created according to intervals for judgment 't10' to 't6' stored in the data storage units (9) to (5). In the explanation below, the intervals for judgment stored in the data storage unit (5) are intervals for judgment 1, the intervals for judgment stored in the data storage unit (6) are intervals for judgment 2, the intervals for judgment stored in the data storage unit (7) are intervals for judgment 3, the intervals for judgment stored in the data storage unit (8) are intervals for judgment 4, and the intervals for judgment stored in the data storage unit (9) are intervals for judgment 5.

in the meantime, intervals stored in the data storage units (4) to (1) are intervals for calculation in order to calculate a standard interval for judging whether each of the first individual data constituting the preliminary data rows is "0" or "1", and the standard interval is calculated according to the intervals for calculation stored in the data storage units (4) to (1), as described later. In the explanation below, the intervals for calculation stored in the data storage unit (4) are intervals for calculation 4, the intervals for calculation stored in the data storage unit (3) are intervals for calculation 3, the intervals for calculation stored in the data storage unit (2) are intervals for calculation 2, and the intervals for calculation stored in the data storage unit (1) are intervals for calculation 1.

Meanwhile, intervals stored in the data storage unit (0) are intervals for eliminating an influence of noise. If last intervals stored in the data storage unit (9) are less than a certain value, and eventually it is assumed that a noise peak has been detected, a sum of the last intervals stored in the data storage unit (9) and the intervals stored in the data storage unit (8) is stored in the data storage unit (9), and intervals having been stored in a data storage unit (m−1) (wherein, 'm' is an integer in a range from 1 to 7) are now stored in a data storage unit (m). Namely, in this case, the sum of the last intervals stored in the data storage unit (9) and the intervals stored in the data storage unit (8) is stored in the data storage unit (9), and the intervals stored in the data storage units (0) to (8) are sequentially shifted in such a way; from the data storage unit (0) to the data storage unit (1), - - -, from the data storage unit (7) to the data storage unit (8).

Figure 6:
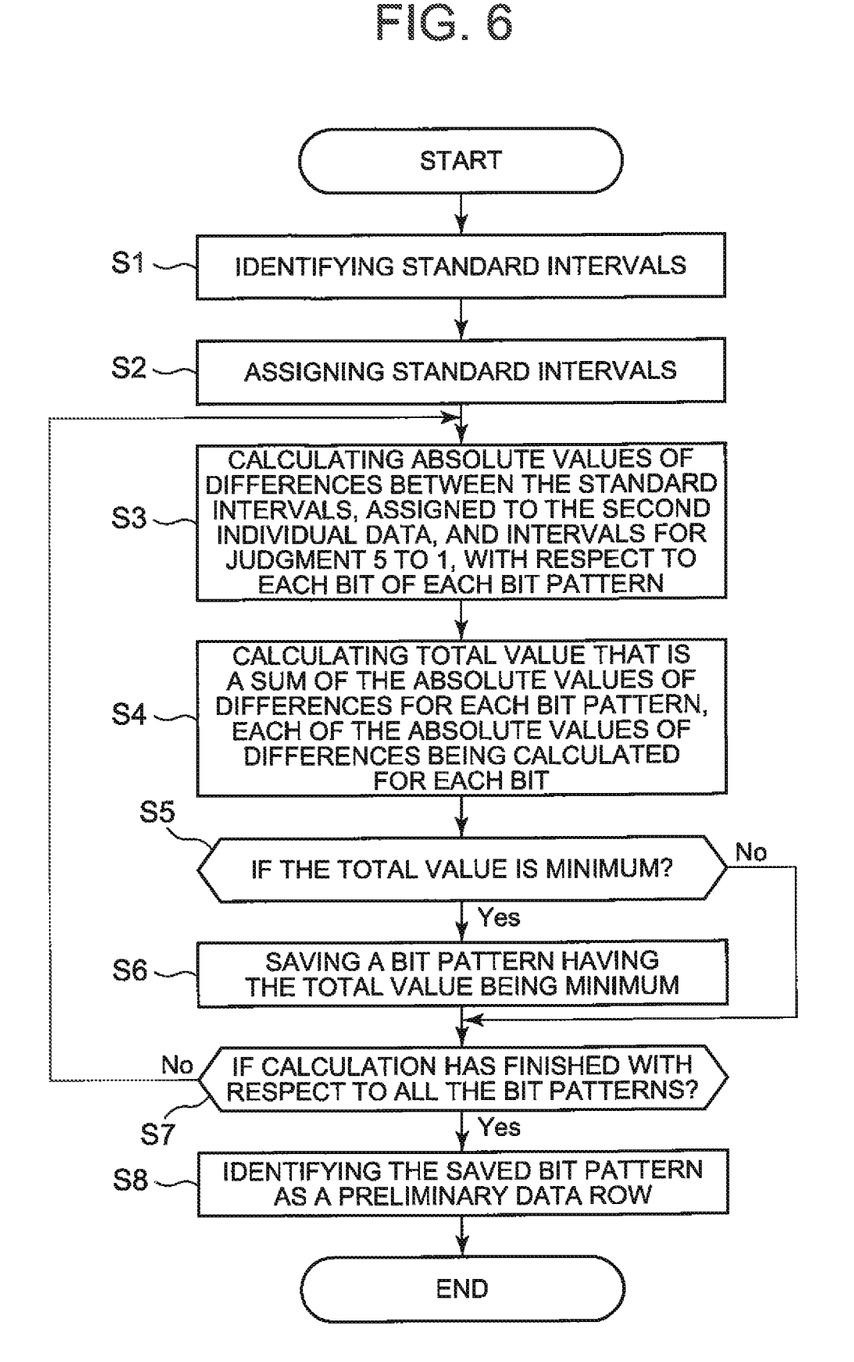
FIG. 6 is a flowchart for explaining a method for creating preliminary data rows in the preliminary data creating section shown in FIG. 1.
Figure 7:
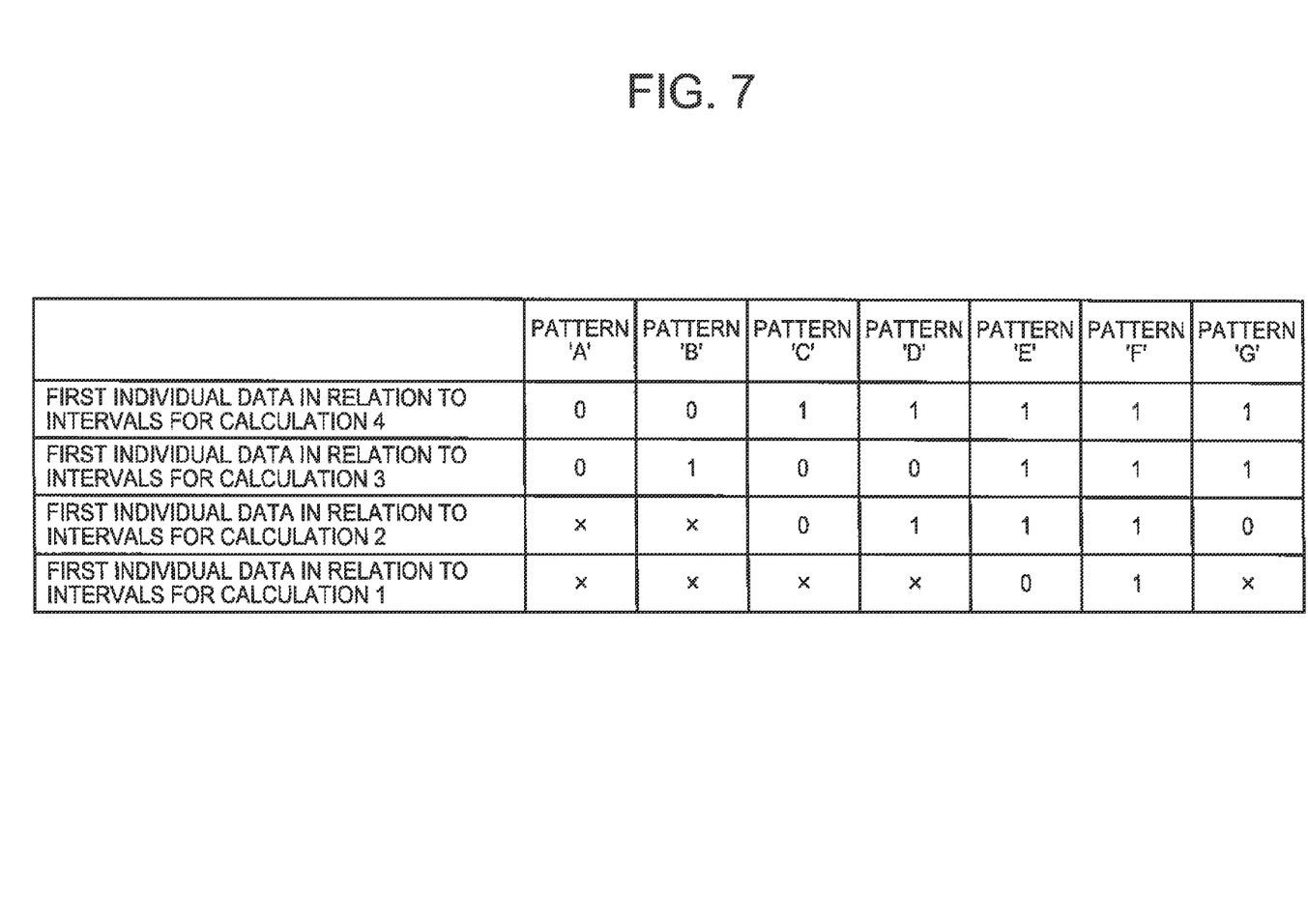
FIG. 7 is a table for explaining a method for concretely identifying a standard interval at a step for identifying a standard interval shown in FIG. 6.

Method for Magnetic Data Demodulation:

FIG. 6 is a flowchart for explaining a method for creating preliminary data rows in the preliminary data creating section 5 shown in FIG. 1. FIG. 7 is a table for explaining a method for concretely identifying a standard interval at a step S1 for identifying a standard interval shown in FIG. 6.

A method for magnetic data demodulation in the data demodulation section 4 is explained below. The magnetic data demodulation in the data demodulation section 4 may be implemented by means of either hardware or software. When being compared with implementation of the magnetic data demodulation by means of software, implementation of the magnetic data demodulation by means of hardware enables a demodulation process at a high speed. In the meantime, implementation of the magnetic data demodulation by means of software makes it possible to easily change the number of bits, and the like, in first individual data constituting a preliminary data row, through rewriting a program.

If seven or more intervals are stored in a storage unit of the preliminary data creating section 5, peaks of a read signal are detected. Then, each time when latest intervals are stored in the data storage unit (9), creating a preliminary data row starts. At the time of creating a preliminary data row starts, at first the preliminary data creating section 5 identifies a standard interval for judging whether each of first individual data constituting the preliminary data row is "0" or "1" (Step S1), as shown in FIG. 6.

For example, when a case of creating an 'n-th' preliminary data row being supposed, it is judged in the present embodiment whether each of first individual data in relation to the intervals for calculation 4 to 1 is "0" or "1", in a course of creating preliminary data rows up to an '(n−1)-th' preliminary data row, according to the intervals for calculation 4 to 1, stored in the data storage units (4) to (1). At Step S1, the preliminary data creating section 5 calculates a standard interval as described below, depending on the first individual data, each of which has been judged to be either "0" or "1" according to the intervals for calculation 4 to 1; and then updates the standard interval by using the calculated standard interval as a new standard interval. In other words, the newly calculated standard interval is identified as a standard interval for creating the 'n-th' preliminary data row.

As a pattern 'A' shows in FIG. 7, if both first individual data judged according to the intervals for calculation 4 and 3 are "0", an average value of the intervals for calculation 4 and 3 is identified as a first standard interval that is a standard for judging first individual data to be "0". Meanwhile, half a value of the first standard interval is identified as a second standard interval that is a standard for judging first individual data to be "1". Namely, in the case of the pattern 'A', values calculated with formulas mentioned below are identified as the first standard interval and the second standard interval. Incidentally, in the formulas mentioned below, the intervals for calculation 4 is expressed as "Calculation IV4", the intervals for calculation 3 is expressed as "Calculation IV3", the intervals for calculation 2 is expressed as "Calculation IV2", and the intervals for calculation 1 is expressed as "Calculation IV1".

The first standard interval=(Calculation $IV4$+Calculation $IV3$)/2

The second standard interval=the first standard interval/2

As a pattern 'B' shows in FIG. 7; in the case where a first individual datum judged according to the intervals for calculation 4 is "0" and a first individual datum judged according to the intervals for calculation 3 is "1"; values calculated with formulas mentioned below are identified as a first standard interval and a second standard interval, since an odd number of "1" data of first individual data never exist between "0" data of the first individual data, as described above, and therefore it is assumed that a first individual datum judged according to the intervals for calculation 2 is "1".

The first standard interval=(Calculation $IV4$+Calculation $IV3$+Calculation $IV2$)/2

The second standard interval=the first standard interval/2

As a pattern 'C' shows in FIG. 7; in the case where a first individual datum judged according to the intervals for calculation 4 is "1" and a first individual datum judged according to the intervals for calculation 3 is "0" and a first individual datum judged according to the intervals for calculation 2 is "0"; values calculated with formulas mentioned below are identified as a first standard interval and a second standard interval.

The first standard interval=(Calculation *IV*3+Calculation *IV*2)/2

The second standard interval=the first standard interval/2

As a pattern 'D' shows in FIG. 7; in the case where a first individual datum judged according to the intervals for calculation 4 is "1" and a first individual datum judged according to the intervals for calculation 3 is "0" and a first individual datum judged according to the intervals for calculation 2 is "1"; values calculated with formulas mentioned below are identified as a first standard interval and a second standard interval, since it is assumed that a first individual datum judged according to the intervals for calculation 1 is "1".

The first standard interval=(Calculation *IV*3+Calculation *IV*2+Calculation *IV*1)/2

The second standard interval=the first standard interval/2

As a pattern 'E' shows in FIG. 7; in the case where a first individual datum judged according to the intervals for calculation 4 is "1" and a first individual datum judged according to the intervals for calculation 3 is "1" and a first individual datum judged according to the intervals for calculation 2 is "1" and a first individual datum judged according to the intervals for calculation 1 is "0"; values calculated with formulas mentioned below are identified as a first standard interval and a second standard interval.

The first standard interval=(Calculation *IV*3+Calculation *IV*2+Calculation *IV*1)/2

The second standard interval=the first standard interval/2

As a pattern 'F' shows in FIG. 7; in the case where all first individual data judged according to the intervals for calculation 4 to 1 are "0", values calculated with formulas mentioned below are identified as a first standard interval and a second standard interval.

The first standard interval=(Calculation *IV*4+Calculation *IV*3+Calculation *IV*2+Calculation IV1)/2

The second standard interval=the first standard interval/2

As a pattern 'G' shows in FIG. 7; in the case where a first individual datum judged according to the intervals for calculation 4 is "1" and a first individual datum judged according to the intervals for calculation 3 is "1" and a first individual datum judged according to the intervals for calculation 2 is "0"; values calculated with formulas mentioned below are identified as a first standard interval and a second standard interval.

The first standard interval=(Calculation *IV*4+Calculation *IV*3+Calculation *IV*2)/2

The second standard interval=the first standard interval/2

After the standard intervals are identified at Step S1, the preliminary data creating section 5 assigns the standard intervals in a template saved in the preliminary data creating section 5 (Step S2). At Step S2, the preliminary data creating section 5 makes an assignment to each of the second individual data constituting a bit pattern in the template; namely, it assigns the first standard interval to a second individual datum being "0", and assigns the second standard interval to a second individual datum being "1". For example, in the case where the first standard interval is 681 (micro-seconds) and the second standard interval is 340.5 (micro-seconds), the first standard interval of 681 (micro-seconds) is assigned to a second individual datum being "0" and the second standard interval of 340.5 (micro-seconds) is assigned to a second individual datum being "1", as shown in FIG. 4.

Subsequently, the preliminary data creating section 5 calculates absolute values of differences between either of the first standard interval or the second standard interval, which is assigned to the second individual data constituting a bit pattern, and intervals for judgment 5 to 1, with respect to each bit of each bit pattern (Step S3). At Step S3, the preliminary data creating section 5 calculates the absolute values of differences between either of the first standard interval or the second standard interval, which is assigned to the second individual data, and the intervals for judgment 5 to 1, with respect to each bit of a bit pattern. For example, at Step S3, the preliminary data creating section 5 calculates to obtain "240", "403", "343", "50", and "44" as the absolute values of differences with respect to Bit Pattern 1, as shown in FIG. 4.

Subsequently, the preliminary data creating section 5 calculates a total value that is a sum of the absolute values of differences, each of which has been calculated for each bit (Namely, the total value is the sum for each bit pattern) (Step S4). For example, at Step S4, the preliminary data creating section 5 calculates to obtain "1080" as the total value with respect to Bit Pattern 1, as shown in FIG. 4.

Subsequently, the preliminary data creating section 5 makes a judgment on whether or not the calculated total value is a minimum value (Step S5). If the calculated total value is a minimum value ("YES" at Step S5), a bit pattern having the total value being minimum is saved (Step S6). Then, the preliminary data creating section 5 judges whether or not calculation of the total value has finished with respect to all the bit patterns (Step S7). If it is judged at Step S7 that calculation of the total value has not yet finished with respect to all the bit patterns ("NO" at Step S7), operation returns to Step S3. In the meantime, if it is judged at Step S5 that the calculated total value is not a minimum value ("NO" at Step S5), operation progress to Step S7.

Meanwhile, if calculation of the total value has already finished at Step S7 with respect to all the bit patterns ("YES" at Step S7), the preliminary data creating section 5 identifies the bit pattern saved at Step S6, as a preliminary data row (Step S8). For example, as shown in FIG. 4, the total value being minimum is given as "399" of Bit Pattern 3, and therefore Bit Pattern 3 is saved in the preliminary data creating section 5 at Step S8 so that the preliminary data creating section 5 identifies a bit pattern (0 1 1 0 0) as a preliminary data row. In other words, the preliminary data creating section 5 creates a preliminary data row (0 1 1 0 0) at Step S8.

At the time of creating a preliminary data row at Step S8, creating an 'n-th' preliminary data row, for example, finishes. Subsequently, after creating the 'n-th' preliminary data row finishes, latest intervals are stored in the data storage unit (9), and then an '(n+1)-th' preliminary data row is created according to the workflow shown in FIG. 6. In this way, all preliminary data rows are created to make judgments on "0" & "1" of all first individual data, and then the demodulated data creating section 6 creates demodulated data according to the first individual data on which the judgments have been made.

Intervals for judgment sequentially shift through the intervals for judgment 5 to 1, and therefore the judgments on "0" & "1" of the first individual data in relation to one set of intervals for judgment are made five times in total. In the present embodiment, when the judgments on "0" & "1" of the first individual data in relation to the intervals for judgment 1 are made, "0" & "1" status of the first individual data is finally defined.

Step S1 in the present embodiment is a standard interval identifying step, at which identified are the first standard interval as a criterion for judging a first individual datum of a preliminary data row to be "0" and the second standard interval as a criterion for judging a first individual datum to be "1". At Step S1, the first standard interval and the second standard interval are calculated and then identified, according to four sets of the intervals for calculation 4 to 1 immediately before five sets of the intervals for judgment 5 to 1.

In the meantime, Step S2 in the present embodiment is a standard interval assigning step for assigning the standard intervals in a template saved in the preliminary data creating section 5, wherein assignments are done to each of the second individual data in such a way that the first standard interval is assigned to a second individual datum being "0", and the second standard interval is assigned to a second individual datum being "1". Then, Step S3 in the present embodiment is a comparison step for comparing the intervals for judgment 5 to 1 with either of the first standard interval or the second standard interval, which is assigned in the template, with respect to each bit of each bit pattern.

In the meantime, through Step S4 to Step S6 and Step S8 in the present embodiment, a bit pattern in relation to a preliminary data row is identified according to a comparison result by Step S3 as the comparison step; and then in a preliminary data identifying step, the identified bit pattern becomes the preliminary data row. Through Step S4 to Step S6 and Step S8, calculated is a total value that is a sum of absolute values for each bit pattern, each of the absolute values being calculated for each bit at Step S3 as the comparison step; and then a bit pattern having the calculated total value being minimum becomes a preliminary data row.

Moreover, Step 1 through S8 in the present embodiment constitute a preliminary data creating step in which a plurality of preliminary data rows for creating demodulated data are each created according to an interval as a time interval between peaks in a read signal of magnetic data.

Primary Advantageous Effect of the Present Embodiment:

As explained above in the present embodiment; compared at Step S3 are the intervals for judgment 5 to 1 with either of the first standard interval or the second standard interval, which is assigned in the template, with respect to each bit of each bit pattern. In the meantime, through Step S4 to Step S6 and Step S8, a bit pattern in relation to a preliminary data row is identified according to a comparison result by Step S3; and then the identified bit pattern becomes the preliminary data row. In other words, in the present embodiment, the preliminary data row is identified by using five sets of the intervals for judgment 5 to 1. Therefore, even in the case where a transfer speed of the card 2 fluctuates on a grand scale, or a recording accuracy of magnetic data recorded in the card 2 is low, it becomes possible to appropriately identify the preliminary data row so that it becomes possible to create appropriate demodulated data out of the plurality of preliminary data rows. Namely, in the present embodiment, it becomes possible to appropriately demodulate the magnetic data even though a transfer speed of the card 2 fluctuates on a grand scale, or a recording accuracy of the magnetic data recorded in the card 2 is low.

In the present embodiment; calculated at Step S3 are the absolute values of differences between the intervals for judgment 5 to 1 and either of the first standard interval or the second standard interval, which is assigned in the template, with respect to each bit of each bit pattern; calculated at Step 4 is the total value that is a sum of absolute values for each bit pattern, each of the absolute values being calculated for each bit; and then a bit pattern having the calculated total value being minimum becomes a preliminary data row through Step S5, Step S6, and Step S8. Therefore, it becomes possible to appropriately identify the preliminary data row by means of relatively easy processing.

In the present embodiment; at Step S1, the first standard interval and the second standard interval are calculated and then identified, according to four sets of the intervals for calculation 4 to 1 immediately before five sets of the intervals for judgment 5 to 1. Therefore, it becomes possible to identify the first standard interval and the second standard interval further appropriately, even though a transfer speed of the card 2 fluctuates on a grand scale. Accordingly, in the present embodiment, it becomes possible to demodulate the magnetic data further appropriately, even though a transfer speed of the card 2 fluctuates on a grand scale.

Other Embodiments:

An embodiment and its modification described above are an example of a preferred embodiment according to the present invention. Nevertheless, the present invention is not limited to the above embodiment and various variations and modifications may be made without changing the concept of the present invention.

Figure 8:
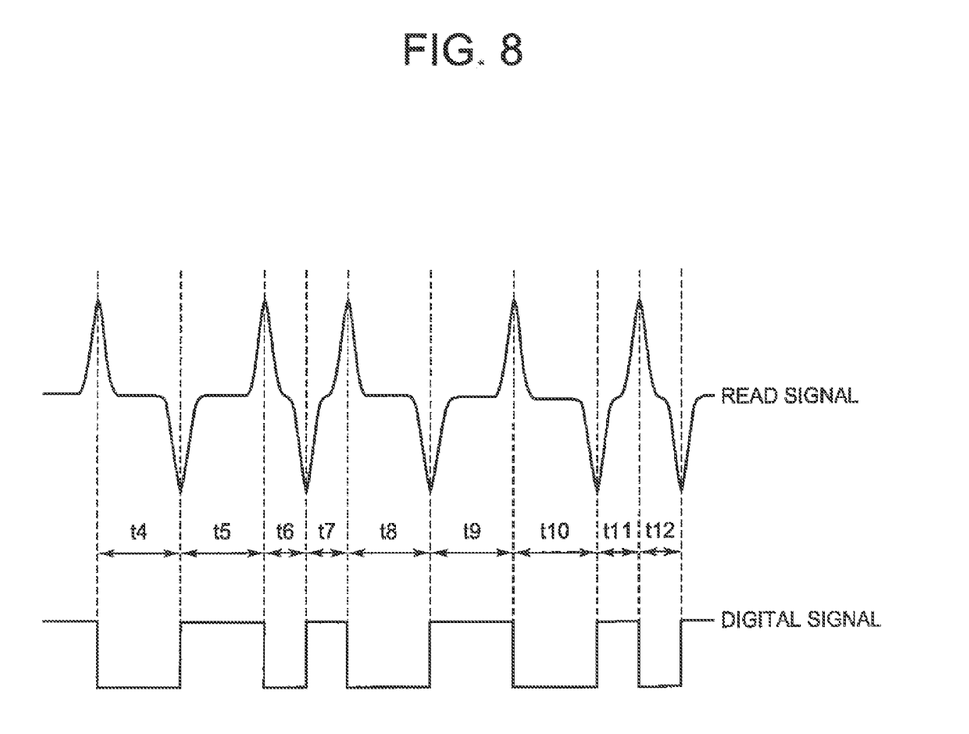
FIG. 8 is a drawing for explaining an outline of demodulated data creating procedures according to another embodiment of the present invention.

In the embodiment described above, the preliminary data creating section 5 creates a plurality of preliminary data rows for creating demodulated data, according to intervals t1 to t19, each of which is a time interval between peaks in a read signal of analog magnetic data output from the magnetic head 3. Alternatively, the preliminary data creating section 5 may create a plurality of preliminary data rows for creating demodulated data, according to intervals t1 to t19, for example, each of which is a reversing time interval in a digital signal (Refer to FIG. 8) created out of the read signal of analog magnetic data.

In the embodiment described above, at Step S3, the preliminary data creating section 5 calculates absolute values of differences between either of the first standard interval or the second standard interval, which is assigned to the second individual data constituting a bit pattern, and intervals for judgment 5 to 1, with respect to each bit of each bit pattern. Alternatively, at Step S3, the preliminary data creating section 5 may calculate squared values, for example, each of which is obtained by squaring each of differences between either of the first standard interval or the second standard interval, assigned to the second individual data constituting a bit pattern, and the intervals for judgment 5 to 1, with respect to each bit of each bit pattern. In this case, at Step S4, the preliminary data creating section 5 calculates a total value that is a sum of the squared values of differences for each bit pattern, each of the squared values having been calculated for each bit. Then, if the calculated total value is a minimum value ("YES" at Step S5), a bit pattern having the total value being minimum is saved at Step S6. In this case, it still becomes possible to appropriately identify the preliminary data row, even without comparing in size the intervals for judgment 5 to 1 and either of the first standard interval or the second standard interval, assigned to the second individual data constituting a bit pattern.

Moreover, at Step S3, the preliminary data creating section 5 may calculate deviations of the intervals for judgment 5 to 1 from either of the first standard interval or the second standard interval, assigned to the second individual data constituting a bit pattern, with respect to each bit pattern.

In the embodiment described above, a preliminary data row includes 5-bit first individual data. Alternatively, a preliminary data row may include first individual data of, for example, 2-bit to 4-bit; or furthermore it may include first individual data of 6-bit or a greater number of bits. In such a case, listed in the template are bit patterns, each of which includes second individual data of the same number of bits as that of the first individual data of the preliminary data row. Incidentally, in the case where a preliminary data row includes first individual data of 3-bit or a greater number of bits, it becomes possible to identify the preliminary data row more appropriately, even though a transfer speed of the card 2 fluctuates on a grand scale, or a recording accuracy of magnetic data recorded in the card 2 is low. Meanwhile, in the case where a preliminary data row includes first individual data of 8-bit or a less number of bits, it becomes possible to prevent the process time for creating the preliminary data row from unnecessarily becoming long.

In the embodiment described above, at Step S1, the preliminary data creating section 5 calculates the first standard interval and the second standard interval; according to intervals for calculation of two bits in the case of a first individual datum in relation to intervals for calculation being "0"; or according to intervals for calculation of one bit in the case of a first individual datum in relation to intervals for calculation being "0", and intervals for calculation of two bits in the case of a first individual datum in relation to intervals for calculation being "1"; or according to intervals for calculation of four bits in the case of a first individual datum in relation to intervals for calculation being "1". In other words, the preliminary data creating section 5 calculates the first standard interval and the second standard interval according to intervals for calculation of two bits in the case of a first individual datum being "0" at Step S1. Alternatively, the first standard interval and the second standard interval may be calculated, for example, according to intervals for calculation of one bit in the case of a first individual datum being "0", or the first standard interval and the second standard interval may be calculated according to intervals for calculation of three bits or more in the case of a first individual datum being "0".

In the embodiment described above, 13 bit patterns, i.e., the bit pattern 1 to the bit pattern 13, out of 32 bit patterns supposed as 5-bit bit patterns are listed in the template saved in the preliminary data creating section 5. Alternatively, for example, 20 bit patterns out of 32 bit patterns supposed as 5-bit bit patterns may be listed in the template, the 20 bit patterns not involving other 12 bit patterns in which an odd number of "1" data exist between "0" data.

In the embodiment described above, the device for magnetic data demodulation 1 is a card reader of a manual operation type. Alternatively, the device for magnetic data demodulation 1 may be a card reader of a card transfer type equipped with a mechanism, such as a transfer roller and the like, for transferring the card 2. In this case, the first standard interval and the second standard interval may be identified as done in the embodiment described above, or the first standard interval and the second standard interval may be constant values. In the case where the first standard interval and the second standard interval are constant values, the first standard interval and the second standard interval should be assigned beforehand in the template.

In the embodiment described above, magnetic data are recorded in the card 2 through an F2F frequency modulation method. Alternatively, magnetic data may be recorded in the card 2 through any other magnetic data recording method, such as an F3F frequency modulation method and the like. Furthermore, though the magnetic information recording medium in the embodiment described above is the card 2, alternatively the magnetic information recording medium may be any other kind of medium, such as a bankbook and so on.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1. Device for magnetic data demodulation
2. Card (Magnetic information recording medium)
3. Magnetic head
4. Data demodulation section
5. Preliminary data creating section
6. Demodulated data creating section
S1. Standard interval identifying step (Part of the preliminary data creating step)
S2. Standard interval assigning step (Part of the preliminary data creating step)
S3. Comparison step (Part of the preliminary data creating step)
S4 to S6, and S8. Preliminary data identifying step (Part of the preliminary data creating step)
S7. Part of the preliminary data creating step

The invention claimed is:

1. A method for magnetic data demodulation, by which magnetic data recorded in a magnetic information recording medium is read out for creating demodulated data, comprising:
   a preliminary data creating step which creates a plurality of preliminary data rows for creating the demodulated data according to intervals;
   wherein each interval is:
      a time interval between peaks in a read signal of the magnetic data in an analog state; or
      a reversing time interval in a digital signal created from the read signal;
   wherein each of the preliminary data rows includes first individual data identified according to the intervals, the first individual data being a plurality of bits; and
   wherein the preliminary data creating step includes:
      a standard interval identifying step for identifying:
         a first standard interval being the interval as a criterion for judging a first individual datum of the preliminary data row to be "0"; and
         a second standard interval being the interval as a criterion for judging a first individual datum to be "1";
      a standard interval assigning step for making assignments for each of second individual data in a template, where the template lists at least part of a plurality of bit patterns including the second individual data that have the same number of plural bits as the first individual data constituting the preliminary data row have, where the standard interval assigning step:
assigns the first standard interval to a second individual datum being "0"; and
assigns the second standard interval to a second individual datum being "1";
a comparison step for comparing a plurality of intervals for judgment as the intervals for identifying the first individual data with either of the first standard interval or the second standard interval, which is assigned in the template, with respect to each bit of each of the bit patterns; and
a preliminary data identifying step for:
identifying the bit pattern in relation to the preliminary data row according to a comparison result at the comparison step; and
setting the preliminary data row with the identified bit pattern.

2. The method for magnetic data demodulation according to claim 1;
wherein the comparison step further includes calculating the absolute values of differences between the intervals for judgment and either of the first standard interval or the second standard interval, which is assigned in the template, with respect to each bit of each of the bit patterns; and
wherein the preliminary data identifying step further includes:
calculating is the total value that is a sum of absolute values for each bit pattern, each of the absolute values being calculated for each bit at the comparison step; and
then the bit pattern having the calculated total value being minimum becomes the preliminary data row.

3. The method for magnetic data demodulation according to claim 1;
wherein the comparison step further includes calculating squared values, each of which is obtained by squaring each of differences between the intervals for judgment and either of the first standard interval or the second standard interval, which is assigned in the template, with respect to each bit of each of the bit patterns; and
wherein the preliminary data identifying step further includes:
calculating the total value that is a sum of squared values for each bit pattern, each of the squared values being calculated for each bit at the comparison step; and
then the bit pattern having the calculated total value being minimum becomes the preliminary data row.

4. The method for magnetic data demodulation according to claim 1;
wherein, in the standard interval identifying step, the first standard interval and the second standard interval are calculated and then identified, according to one set or at least two sets of the intervals immediately before the plurality of intervals for judgment.

5. The method for magnetic data demodulation according claim 1;
wherein the preliminary data row includes the first individual data with the number of bits in a range of 3-bit to 8-bit.

6. A device for magnetic data demodulation comprising:
a magnetic head configured to read out magnetic data recorded in a magnetic information recording medium; and
a data demodulation section configured to create demodulated data by means of demodulating the magnetic data read out by the magnetic head;
wherein the data demodulation section includes:
a preliminary data creating section that creates a plurality of preliminary data rows for creating the demodulated data according to intervals, where each interval is:
a time interval between peaks in a read signal of the magnetic data in an analog state output from the magnetic head; or
a reversing time interval in a digital signal created from the read signal; and
a demodulated data creating section that creates the demodulated data according to the plurality of preliminary data rows created by the preliminary data creating section;
wherein each of the preliminary data rows includes first individual data identified according to the intervals, the first individual data being a plurality of bits;
wherein the preliminary data creating section saves a template, in which listed are at least part of a plurality of bit patterns including the second individual data that have the same number of plural bits as the first individual data constituting the preliminary data row have;
wherein the preliminary data creating section identifies:
a first standard interval being the interval as a criterion for judging a first individual datum of the preliminary data row to be "0"; and
a second standard interval being the interval as a criterion for judging a first individual datum to be "1";
wherein the preliminary data creating section makes assignments for each of second individual data in the template in such a way as to:
assign the first standard interval to a second individual datum being "0", and
assign the second standard interval to a second individual datum being "1";
wherein the preliminary data creating section compares a plurality of intervals for judgment as the intervals for identifying the first individual data with either of the first standard interval or the second standard interval, which is assigned in the template, with respect to each bit of each of the bit patterns; and
wherein the preliminary data creating section:
identifies the bit pattern in relation to the preliminary data row according to the comparison result; and
sets the preliminary data row with the identified bit pattern.

* * * * *